(12) United States Patent
Sahai et al.

(10) Patent No.: US 10,200,918 B2
(45) Date of Patent: Feb. 5, 2019

(54) SIGNALING TO INDICATE WHETHER PHYSICAL BROADCAST CHANNEL REPETITION IS ENABLED IN A TARGET CELL

(71) Applicant: QUALCOMM Incorporated, San Diego, CA (US)

(72) Inventors: Achaleshwar Sahai, San Jose, CA (US); Yi Su, San Jose, CA (US); Shashidhar Vummintala, Bangalore (IN); Masato Kitazoe, Hachiouji (JP)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/681,637

(22) Filed: Aug. 21, 2017

(65) Prior Publication Data

US 2018/0098252 A1    Apr. 5, 2018

(30) Foreign Application Priority Data

Oct. 3, 2016   (IN) .............................. 201641033706

(51) Int. Cl.
*H04B 7/14*      (2006.01)
*H04W 36/00*    (2009.01)
(Continued)

(52) U.S. Cl.
CPC ........... *H04W 36/0055* (2013.01); *H04L 1/08* (2013.01); *H04L 5/0048* (2013.01);
(Continued)

(58) Field of Classification Search
CPC ......... H04W 36/0055; H04W 36/0072; H04W 5/0007; H04L 1/08; H04L 5/0048; H04L 5/0007
See application file for complete search history.

(56) References Cited

U.S. PATENT DOCUMENTS

2015/0043420 A1* 2/2015 Xiong ..................... H04W 4/70
                                                              370/315
2016/0338010 A1* 11/2016 Rico Alvarino .......... H04J 4/00
(Continued)

OTHER PUBLICATIONS

International Search Report and Written Opinion—PCT/US2017/048016—ISA/EPO—dated Dec. 5, 2017.
(Continued)

*Primary Examiner* — Barry W Taylor
(74) *Attorney, Agent, or Firm* — Arent Fox, LLP

(57) ABSTRACT

The present disclosure provides a mechanism that may allow a UE to determine whether PBCH repetition is enabled in the target cell without performing a hypothesis test. For example, the apparatus may receive a handover message from a serving cell. In an aspect, the handover message may be associated with a handover procedure to a target cell. In addition, the apparatus may determine whether to perform a hypothesis test to determine if a PBCH repetition is enabled in the target cell based on the handover message. In one example, the apparatus may determine not to perform the hypothesis test when the handover message includes information that indicates if the PBCH repetition is enabled in the target cell. In another example, the apparatus may determine to perform the hypothesis test when the handover message does not include information that indicates if the PBCH repetition is enabled in the target cell.

18 Claims, 12 Drawing Sheets

(51) Int. Cl.
*H04L 1/08* (2006.01)
*H04L 5/00* (2006.01)
*H04W 72/00* (2009.01)

(52) U.S. Cl.
CPC ....... *H04W 36/0072* (2013.01); *H04L 5/0007* (2013.01); *H04W 72/005* (2013.01)

(56) References Cited

U.S. PATENT DOCUMENTS

2017/0311355 A1* 10/2017 Yi ................... H04L 5/0053
2018/0014278 A1* 1/2018 Papasakellariou .... H04L 5/0053

OTHER PUBLICATIONS

Qualcomm et al., "Way Forward on MIB Acquisition Delay in eMTC", 3GPP Draft; R4-166836, 3rd Generation Partnership Project (3GPP), Mobile Competence Centre, 650, Route Des Lucioles, F-06921 Sophia-Antipolis Cedex, France, vol. RAN WG4, No. Goteborg; Aug. 31, 2016, XP051144497, Retrieved from the Internet: URL:http://www.3gpp.org/ftp/tsg_ran/WG4_Radio/TSGR4_80/Docs/ [retrieved on Aug. 31, 2016], 4 pages.

Qualcomm Incorporated: "Handover Enhancement Via Indication of System Frame Number and Repetition of PBCH in eMTC", 3GPP Draft; R4-1610409, 3rd Generation Partnership Project (3GPP), Mobile Competence Centre, 650, Route Des Lucioles, F-06921 Sophia-Antipolis Cedex, France, vol. RAN WG4, No. Reno, Nevada, USA; Nov. 14, 2016, XP051180496, Retrieved from the Internet: URL:http://www.3gpp.org/ftp/Meetings_3GPP_SYNC/RAN4/Docs/ [retrieved on Nov. 14, 2016], 3 pages.

Qualcomm Incorporated: "Target Cell Optional PBCH Repetition Status Indication", 3GPP Draft; R2-1709289, 3rd Generation Partnership Project (3GPP), Mobile Competence Centre, 650, Route Des Lucioles, 7-06921 Sophia-Antipolis Cedex, France, vol. RAN WG2, No. Berlin, Germany; Aug. 20, 2017, XP051319052, Retrieved from the Internet: URL:http://www.3gpp.org/ftp/Meetings_3GPP_SYNC/RAN2/Docs/ [retrieved on Aug. 20, 2017], 7 pages.

* cited by examiner

SIGNALING TO INDICATE WHETHER PHYSICAL BROADCAST CHANNEL REPETITION IS ENABLED IN A TARGET CELL

CROSS-REFERENCE TO RELATED APPLICATION

This application claims the benefit of Indian Provisional Patent Application No. 201641033706, entitled "SIGNALING TO INDICATE WHETHER PHYSICAL BROADCAST CHANNEL REPETITION IS ENABLED IN A TARGET CELL" and filed on Oct. 3, 2016, which is expressly incorporated by reference herein in its entirety.

BACKGROUND

Field

The present disclosure relates generally to communication systems, and more particularly, to enabling a user equipment (UE) to determine whether physical broadcast channel (PBCH) repetition is enabled in a target cell without performing a hypothesis test.

Background

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

During a handover procedure from a serving cell to a target cell, a UE may not know if PBCH repetition is enabled in the target cell. To determine whether PBCH repetition is enabled in the target cell, the UE may perform a hypothesis test. Performing a hypothesis test may use additional processing, use additional memory, and/or cause a delay in reliably determining whether PBCH repetition is enabled in the target cell. There is a need for a mechanism that allows the UE to determine whether PBCH repetition is enabled in the target cell without performing a hypothesis test.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

During a handover procedure from a serving cell to a target cell, a UE may not be aware if PBCH repetition is enabled in the target cell. Information indicating a PBCH repetition may be useful to the UE since the UE may ignore resource elements (REs) associated with the PBCH repetition when decoding a control channel and/or a data channel of the target cell. To determine whether PBCH repetition is configured in the target cell, the UE may need to perform a hypothesis test. Performing a hypothesis test may need and/or create additional processing, additional memory, and/or a delay in reliably determining whether PBCH repetition is enabled in the target cell. There is a need for a mechanism that allows the UE to determine whether PBCH repetition is enabled in the target cell without performing a hypothesis test.

The present disclosure provides a mechanism that may allow a UE to determine whether PBCH repetition is enabled in a target cell without performing a hypothesis test. In one aspect of the present disclosure, a base station of the serving cell may detect whether PBCH repetitions are enabled in the target cell. Information that indicates if PBCH repetition is enabled in the target cell may be included in a handover message that is transmitted by the eNB of the serving cell to the UE. In certain aspects, the UE may use the PBCH repetition information included in the handover message to determine if PBCH repetition is enabled in the target cell. Hence, the UE may determine if PBCH repetitions are enabled in the target cell without additional processing, additional memory, and/or a delay in reliably detecting PBCH repetition that may be caused by performing a hypothesis test.

In an aspect of the disclosure, a method, a computer-readable medium, and an apparatus are provided. The apparatus may receive a handover message from a serving cell. In an aspect, the handover message may be associated with a handover procedure to a target cell. In addition, the apparatus may determine whether to perform a hypothesis test to determine if a PBCH repetition is enabled in the target cell based on the handover message.

In another aspect, the apparatus may initiate a handover procedure for a UE to a target cell. The apparatus may determine if a PBCH repetition is enabled in the target cell. Still further, the apparatus may transmit a handover message to the UE. In an aspect, the handover message may include information that indicates if PBCH repetition is enabled in the target cell.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
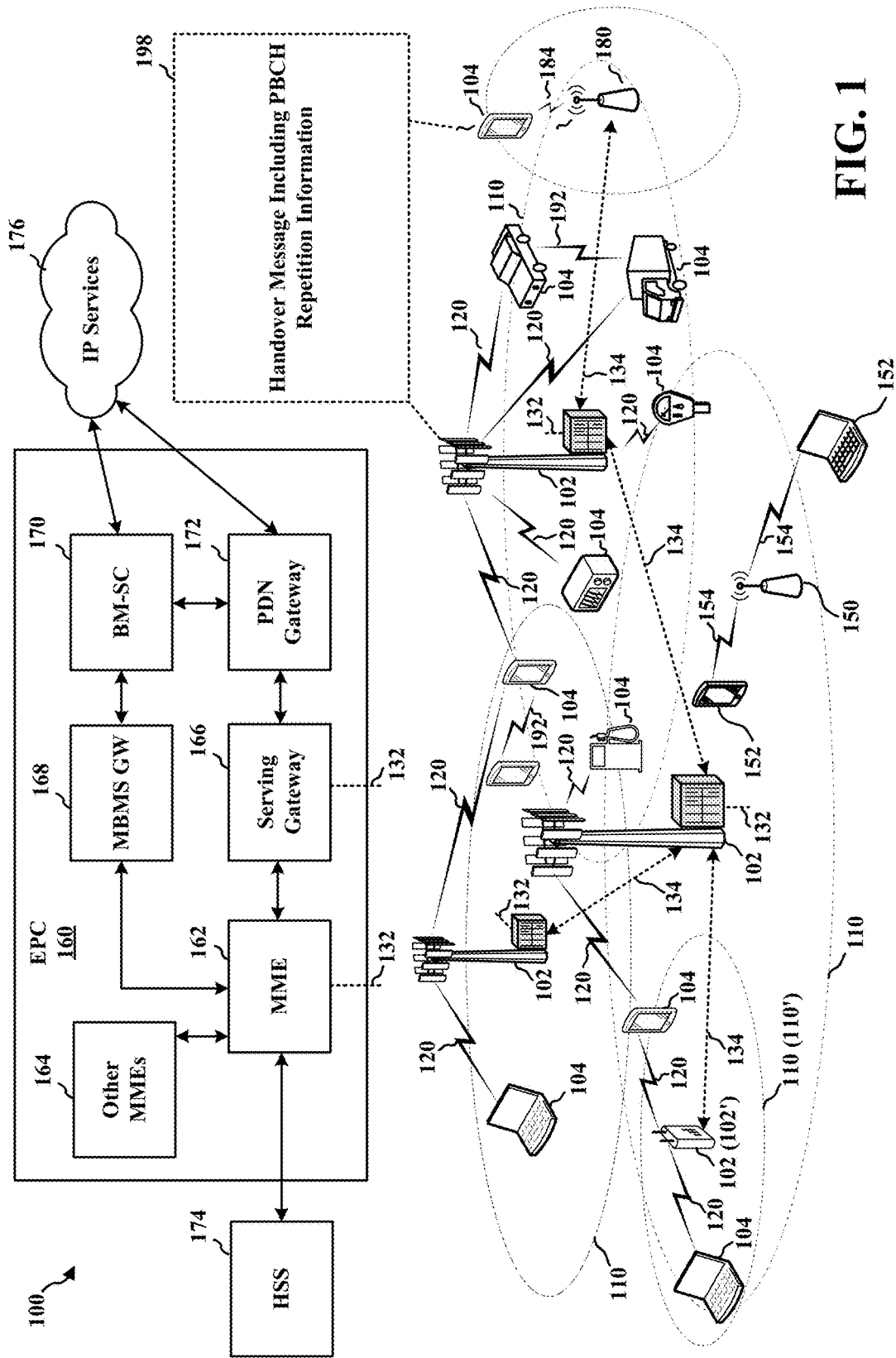
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, and an Evolved Packet Core (EPC) 160. The base stations 102 may include macro cells (high power cellular base station) and/or small cells (low power cellular base station). The macro cells include base stations. The small cells include femtocells, picocells, and microcells.

The base stations 102 (collectively referred to as Evolved Universal Mobile Telecommunications System (UMTS) Terrestrial Radio Access Network (E-UTRAN)) interface with the EPC 160 through backhaul links 132 (e.g., S1 interface). In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160) with each other over backhaul links 134 (e.g., X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macro cells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100 MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 192. The D2D communication link 192 may use the DL/UL WWAN spectrum. The D2D communication link 192 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

The gNodeB (gNB) 180 may operate in mmW frequencies and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band has extremely high path loss and a short range. The mmW base station 180 may utilize beamforming 184 with the UE 104 to compensate for the extremely high path loss and short range.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The base station may also be referred to as a gNB, Node B, evolved Node B (eNB), an access point, a base transceiver station, a radio base station, a radio transceiver, a transceiver function, a basic service set (BSS), an extended service set (ESS), or some other suitable terminology. The base station 102 provides an access point to the EPC 160 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a toaster, or any other similar functioning device. Some of the UEs 104 may be referred to as IoT devices (e.g., parking meter, gas pump, toaster, vehicles, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, the base station 102 may be configured to include information in a handover message that indicates to the UE 104 whether PBCH repetition is enabled in a target cell (198), e.g., as described in connection with any of FIGS. 4A, 4B, and 5-11.

Figure 2:
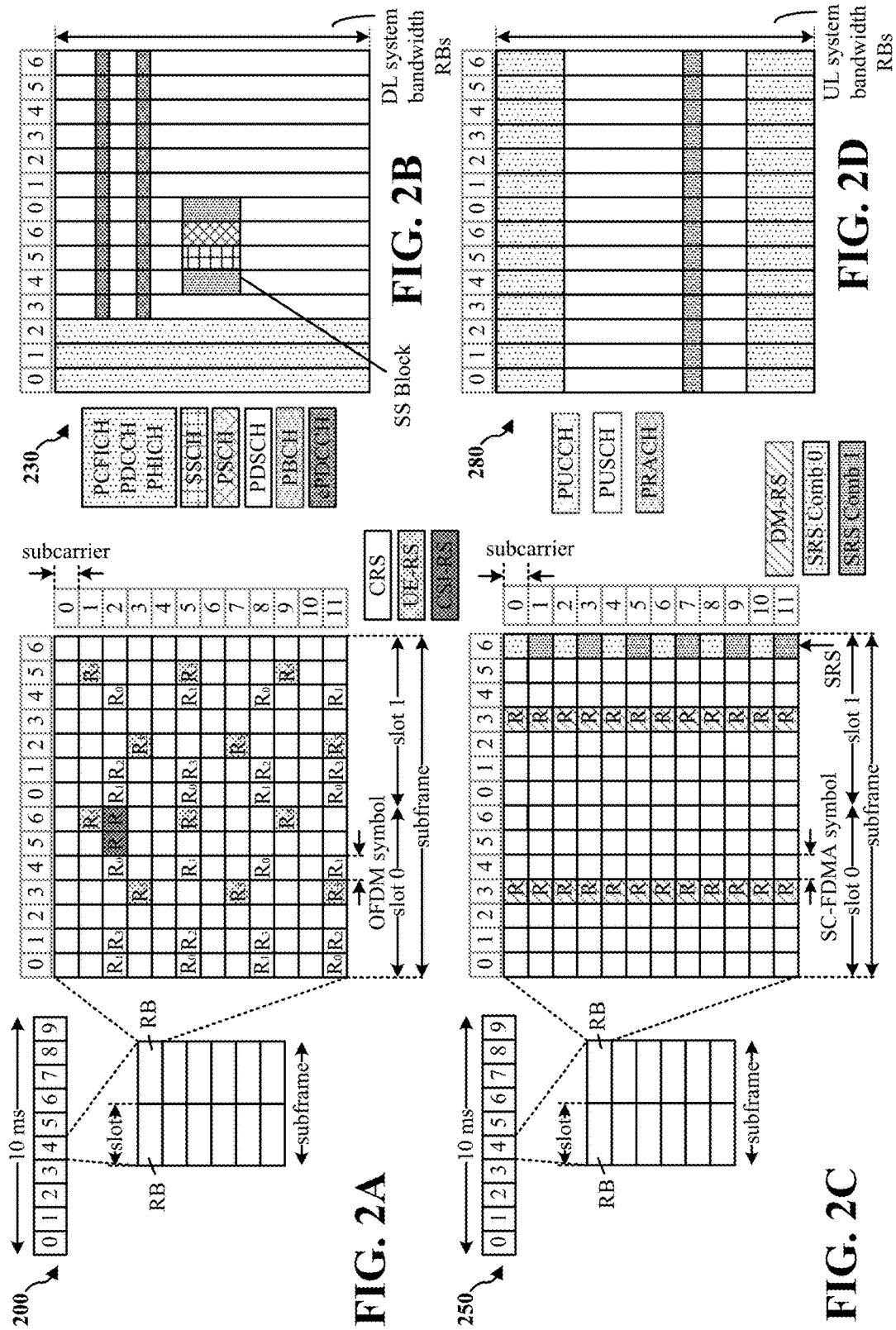
FIGS. 2A, 2B, 2C, and 2D are diagrams illustrating LTE examples of a DL frame structure, DL channels within the DL frame structure, an UL frame structure, and UL channels within the UL frame structure, respectively.

FIG. 2A is a diagram 200 illustrating an example of a DL frame structure in LTE. FIG. 2B is a diagram 230 illustrating an example of channels within the DL frame structure in LTE. FIG. 2C is a diagram 250 illustrating an example of an UL frame structure in LTE. FIG. 2D is a diagram 280 illustrating an example of channels within the UL frame structure in LTE. Other wireless communication technologies may have a different frame structure and/or different channels. In LTE, a frame (10 ms) may be divided into 10 equally sized subframes. Each subframe may include two consecutive time slots. A resource grid may be used to represent the two time slots, each time slot including one or more time concurrent resource blocks (RBs) (also referred to as physical RBs (PRBs)). The resource grid is divided into multiple REs. In LTE, for a normal cyclic prefix, an RB contains 12 consecutive subcarriers in the frequency domain and 7 consecutive symbols (for DL, OFDM symbols; for UL, SC-FDMA symbols) in the time domain, for a total of 84 REs. For an extended cyclic prefix, an RB contains 12 consecutive subcarriers in the frequency domain and 6 consecutive symbols in the time domain, for a total of 72 REs. The number of bits carried by each RE depends on the modulation scheme.

As illustrated in FIG. 2A, some of the REs carry DL reference (pilot) signals (DL-RS) for channel estimation at the UE. The DL-RS may include cell-specific reference signals (CRS) (also sometimes called common RS), UE-specific reference signals (UE-RS), and channel state information reference signals (CSI-RS). FIG. 2A illustrates CRS for antenna ports 0, 1, 2, and 3 (indicated as $R_0$, $R_1$, $R_2$, and $R_3$, respectively), UE-RS for antenna port 5 (indicated as $R_5$), and CSI-RS for antenna port 15 (indicated as R). FIG. 2B illustrates an example of various channels within a DL subframe of a frame. The physical control format indicator channel (PCFICH) is within symbol 0 of slot 0, and carries a control format indicator (CFI) that indicates whether the physical downlink control channel (PDCCH) occupies 1, 2, or 3 symbols (FIG. 2B illustrates a PDCCH that occupies 3 symbols). The PDCCH carries downlink control information (DCI) within one or more control channel elements (CCEs), each CCE including nine RE groups (REGs), each REG including four consecutive REs in an OFDM symbol. A UE may be configured with a UE-specific enhanced PDCCH (ePDCCH) that also carries DCI. The ePDCCH may have 2, 4, or 8 RB pairs (FIG. 2B shows two RB pairs, each subset including one RB pair). The physical hybrid automatic repeat request (ARQ) (HARQ) indicator channel (PHICH) is also within symbol 0 of slot 0 and carries the HARQ indicator (HI) that indicates HARQ acknowledgement (ACK)/negative ACK (NACK) feedback based on the physical uplink shared channel (PUSCH). The primary synchronization channel (PSCH) is within symbol 6 of slot 0 within subframes 0 and 5 of a frame, and carries a primary synchronization signal (PSS) that is used by a UE to determine subframe timing and a physical layer identity. The secondary synchronization channel (SSCH) is within symbol 5 of slot 0 within subframes 0 and 5 of a frame, and carries a secondary synchronization signal (SSS) that is used by a UE to determine a physical layer cell identity group number. Based on the physical layer identity and the physical layer cell identity group number, the UE can determine a physical cell identifier (PCI). Based on the PCI, the UE can determine the locations of the aforementioned DL-RS. The PBCH is within symbols 0, 1, 2, 3 of slot 1 of subframe 0 of a frame, and carries a master information block (MIB). The MIB provides a number of RBs in the DL system bandwidth, a PHICH configuration, and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry demodulation reference signals (DM-RS) for channel estimation at the eNB. The UE may additionally transmit sounding reference signals (SRS) in the last symbol of a subframe. The SRS may have a comb structure, and a UE may transmit SRS on one of the combs. The SRS may be used by an eNB for channel quality estimation to enable frequency-dependent scheduling on the UL. FIG. 2D illustrates an example of various channels within an UL subframe of a frame. A physical random access channel (PRACH) may be within one or more subframes within a frame based on the PRACH configuration. The PRACH may include six consecutive RB pairs within a subframe. The PRACH allows the UE to perform initial system access and achieve UL synchronization. A physical uplink control channel (PUCCH) may be located on edges of the UL system bandwidth. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Figure 3:
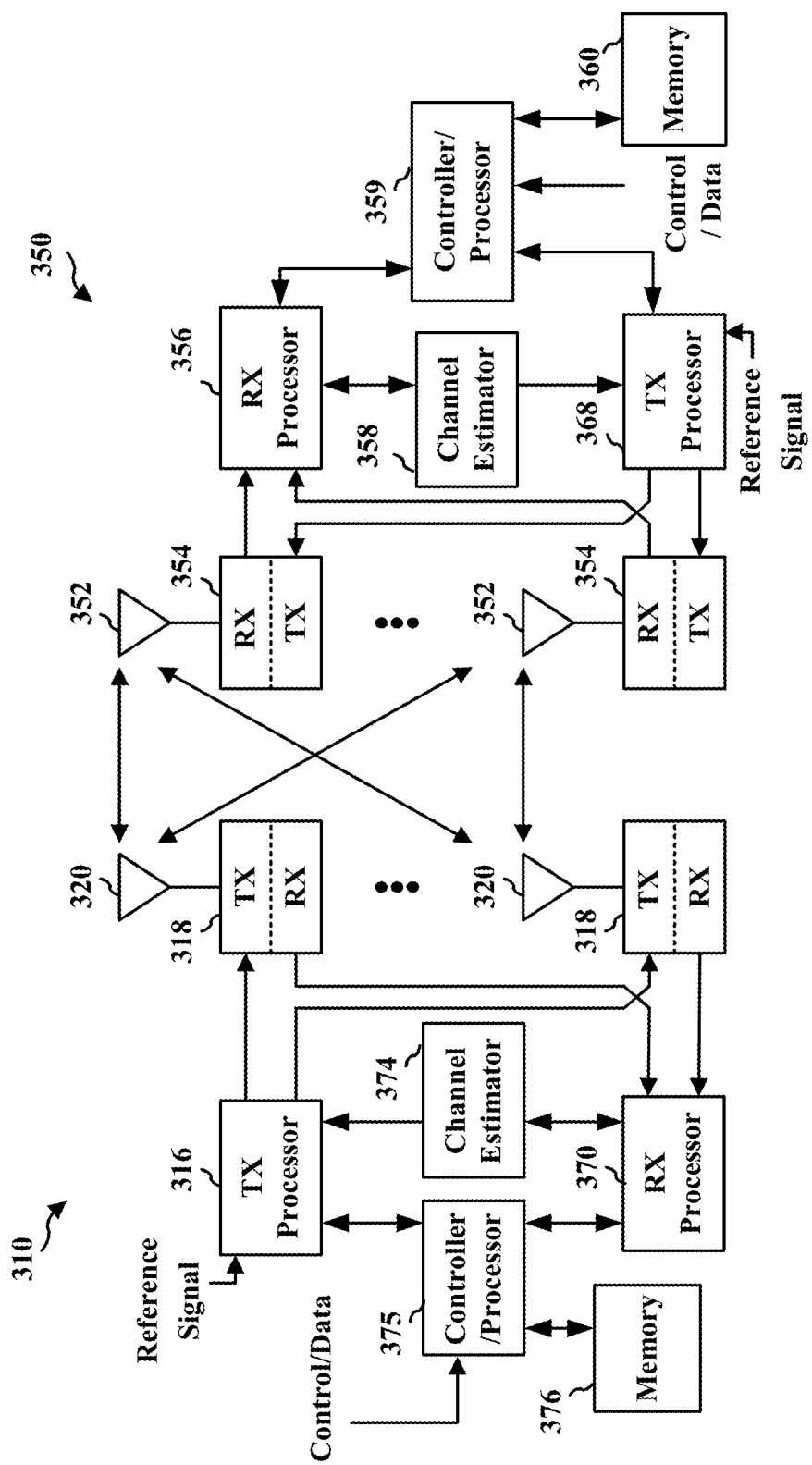
FIG. 3 is a diagram illustrating an example of an evolved Node B (eNB) and UE in an access network.

FIG. 3 is a block diagram of an eNB 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the eNB 310. These soft decisions may be based on channel estimates computed by the channel estimator 358. The soft decisions are then decoded and deinterleaved to recover the data and control signals that were originally transmitted by the eNB 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the eNB 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the eNB 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the eNB 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

Figure 5:
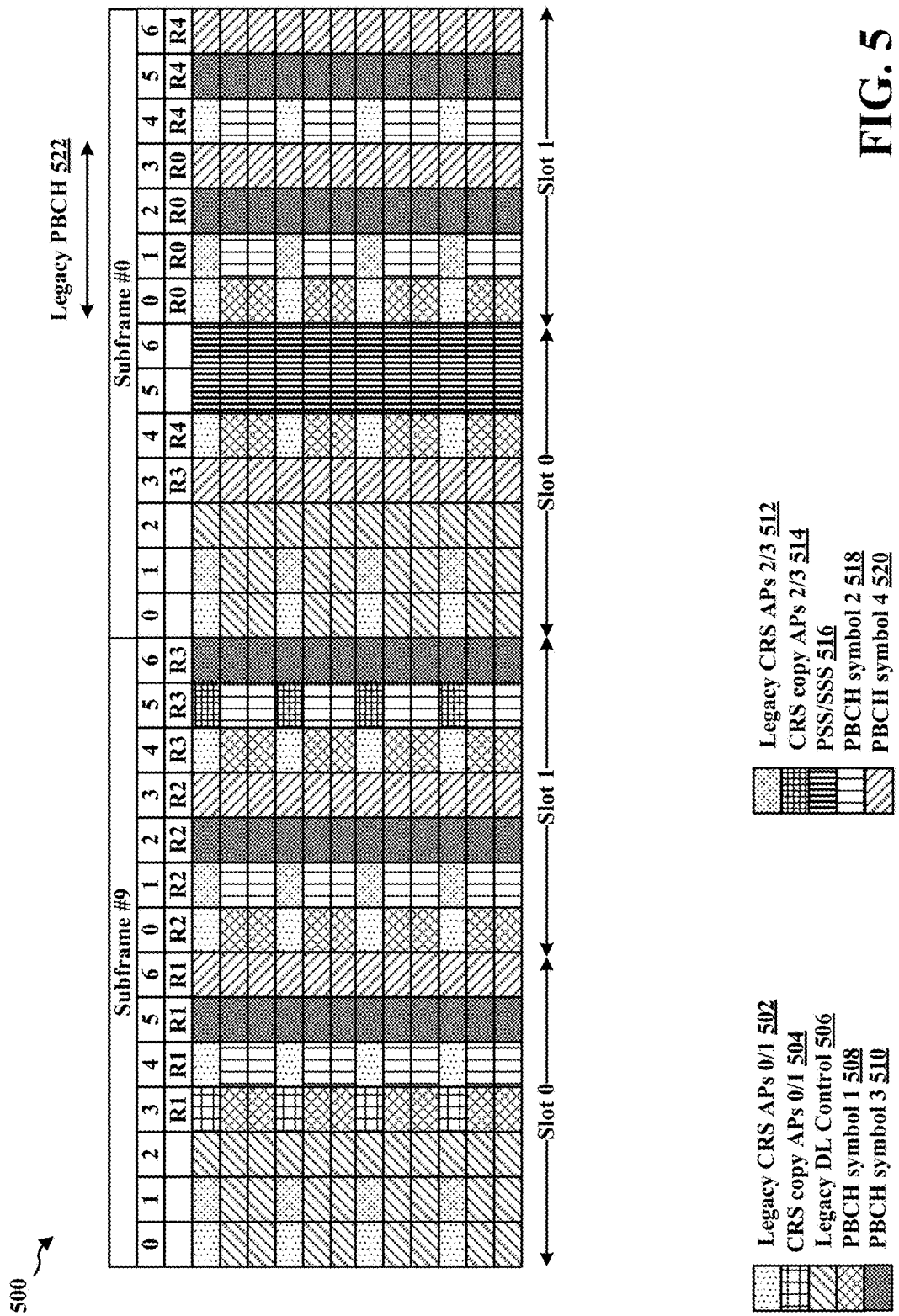
FIG. 5 is a diagram illustrating a transmission that includes a PBCH repetition pattern in accordance with certain aspects of the disclosure.

Symbols of a PBCH may be repeated in a transmission from a base station to provide enhanced coverage within a particular cell. In enhanced machine-type communications (eMTC), a network may optionally configure PBCH repetitions in certain cells. Hence, a cell supporting eMTC may or may not support PBCH repetition. An example of a transmission with a PBCH repetition pattern is illustrated in FIG. 5.

During a handover procedure to a target cell, a serving cell may provide a handover message to a UE. While the handover message may include master information block (MIB) information associated with the target cell, the handover message may not provide PBCH repetition information associated with the target cell. Thus, even if a UE has MIB information for the target cell, the UE may still need to perform hypothesis testing in order to determine whether PBCH repetition has been enabled in the target cell.

Performing a hypothesis test may be detrimental in terms of UE performance by creating additional processing, using additional memory, and/or causing a delay in reliably determining whether PBCH repetition is enabled in the target cell. Moreover, until the UE determines whether PBCH repetition is enabled, the decoding performance of machine-type communications (MTC) PDCCH (MPDCCH) and the PDSCH of the target cell may also be adversely affected at the UE. For example, the decoding performance may be adversely effected because the UE may not know whether to ignore REs associated with PBCH repetitions in MPDCCH and/or PDSCH decoding.

However, if the UE knows whether PBCH repetition is enabled in a target cell, the UE may avoid performing a hypothesis test. Hence, the UE may use less processing and memory, and reduce the time used to determine whether PBCH repetition is enabled in the target cell. In addition, a delay and/or degradation in decoding of the MPDCCH and/or PDSCH at the time of handover may be avoided/reduced if the handover message from the serving cell indicates whether PBCH repetition is enabled in the target cell. In certain configurations, if all the information of the MIB (e.g., including PBCH repetition information) is provided in the handover message, then the UE may avoid decoding the MIB of the target cell altogether.

The present disclosure provides a mechanism by which a UE may determine whether PBCH repetition is enabled in the target cell without the need for a hypothesis test.

For example, a base station of the serving cell may determine whether PBCH repetitions are enabled in the target cell. Information that indicates if PBCH repetition is enabled in the target cell may be included in a handover message that is transmitted by the base station of the serving cell to the UE. In other words, the handover message may provide the UE with information that indicates if PBCH repetition is enabled in the target cell. Hence, the UE may determine if PBCH repetitions are enabled in the target cell without additional processing, additional memory, and/or a delay in reliably detecting PBCH repetition that may be caused by a hypothesis test.

Figure 4A:
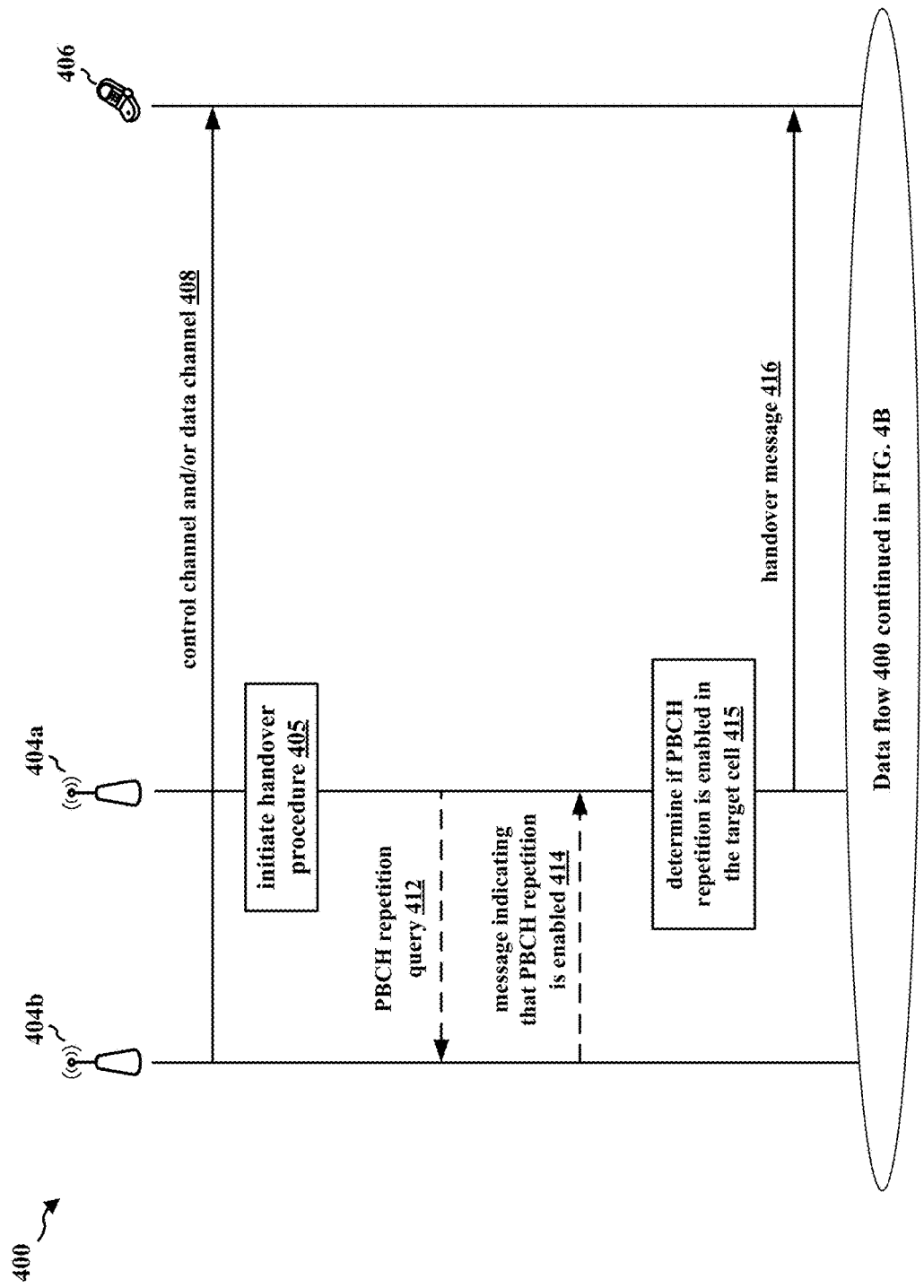
FIGS. 4A and 4B are a diagram of a data flow that may enable a UE to determine whether PBCH repetitions are enabled in a target cell in accordance with certain aspects of the disclosure.
Figure 4B:
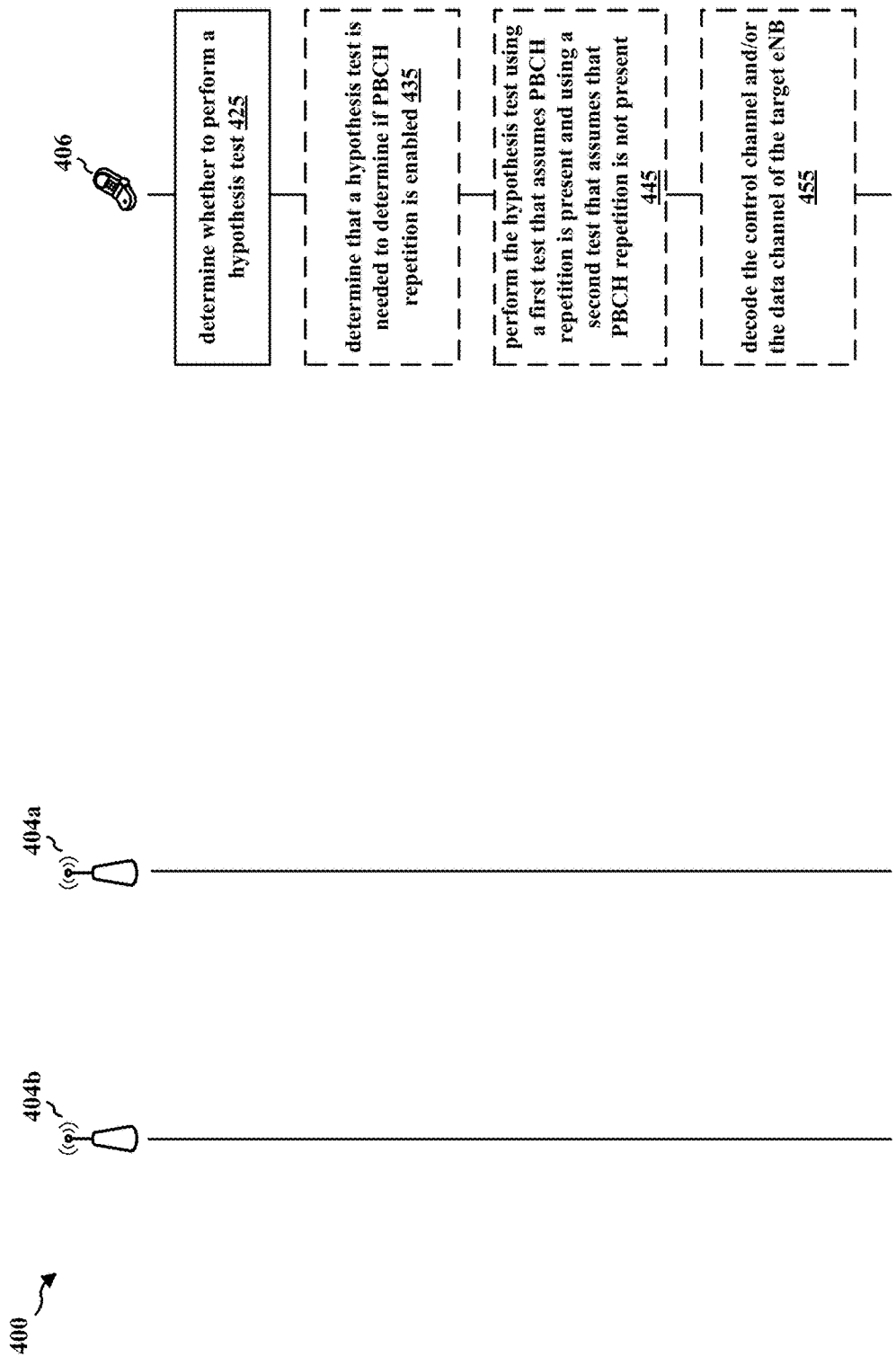

FIGS. 4A and 4B illustrate a data flow 400 that may be used by a UE 406 to determine whether PBCH repetitions are enabled in a target cell during a handover procedure from a serving base station 404a to a target base station 404b. Serving base station 404a may correspond to, e.g., base station 102, 180, eNB 310, the serving base station 750, apparatus 1102/1102'. Target base station 404b may correspond to, e.g., base station 102, 180, eNB 310, the target base station 755, 1050. UE 406 may correspond to, e.g., UE 104, 350, 1055, apparatus 702/702'. In addition, the serving base station 404a, the target base station 404b, and the UE 406 may be configured to communicate using narrowband communications (e.g., NB-IoT and/or eMTC). For example, the UE 406 may be an NB-IoT device and/or an eMTC device. In FIGS. 4A and 4B optional operations are indicated with dashed lines.

Referring to FIG. 4A, the target base station 404b may transmit and/or broadcast a control channel 408 and/or a data channel 408. The serving base station 404a may initiate 405 a procedure to handover the UE 406 to the target base station 404b. To inform the UE 406 of the handover, a handover message 416 may be transmitted by the serving base station 404a.

Serving Base Station Not Configured to Determine PBCH Repetitions

In a first example, the serving base station 404a may not be configured to determine whether the control channel 408 and/or the data channel 408 transmitted by the target base station 404b includes PBCH repetitions. Thus, in the first example, during a handover procedure 405, the serving base station 404a may transmit a handover message 416 to the UE 406 that does not include PBCH repetition information associated with the target base station 404b.

Because the handover message 416 in the first exemplary embodiment does not include PBCH repetition information associated with the target base station 404b, the UE 406 may determine 435 (see FIG. 4B) that a hypothesis test is needed to determine if PBCH repetition is enabled. The UE 406 may perform 445 the hypothesis test using a first test that assumes PBCH repetition is present and using a second test that assumes that PBCH repetition is not present. Using the outcome of the hypothesis test, the UE 406 may decode 455 the control channel 408 and/or the data channel 408 of the target base station 404b.

Because the UE 406 does not know if PBCH repetition is enabled in the target cell, the UE 406 may be unable to avoid performing the hypothesis test. The hypothesis test may use additional processing and use of memory at the UE 406. In addition, delay and degradation in decoding 455 the MPDCCH 408 and/or PDSCH 408 at the time of handover may be unavoidable. Additional details associated with the hypothesis test are discussed below with reference to FIG. 5.

Serving Base Station Configured to Determine PBCH Repetitions

In a second example, the serving base station 404a may be configured to determine whether PBCH repetition is enabled at the target cell. In a first scenario of the second example, PBCH repetitions may be enabled in the target cell. In a second scenario of the second example, PBCH repetitions may not be enabled in the target cell.

During a handover procedure 405 in the second example, the serving base station 404a may be configured to determine 415 if PBCH repetition is enabled in the target cell (e.g., if the control channel 408 and/or data channel 408 of the target base station 404b include PBCH repetitions). For example, the target base station 404b may broadcast a specific message 414 that may be received by the serving base station 404a. The message 414 may indicate that PBCH repetition is enabled in the target cell. Alternatively, the serving base station 404a may query 412 the target cell via over-the-air (OTA) signaling, via a direct connection (e.g., X2 signaling), or via the network (e.g., S1 signaling), or may query the network to determine whether the target cell has PBCH repetition is enabled. In response to the query 412, the target base station 404b may send the message 414 that indicates if PBCH repetition is enabled. Alternatively, the serving base station 404a may maintain a database for tracking whether PBCH repetition is enabled among neighbor cells. A handover message 416 that includes PBCH repetition information may be transmitted by the serving base station 404a to the UE 406.

With reference to the first scenario discussed above, the handover message 416 may indicate that PBCH repetition is enabled at the target base station 404b. Alternatively, with reference to the second scenario discussed above, the handover message 416 may indicate that the PBCH reception is not enabled in the target base station 404b.

In certain configurations, the serving base station 404a may add one or more bit(s) to the handover message 416 that may be used to indicate whether or not PBCH repetition is enabled in the target cell. For example, the one or more bit(s) may be added to a MobilityControlInfo message (e.g., a type of handover message) and/or a RadioResourceConfigCommon message (e.g., a type of handover message) transmitted to the UE 406 during the handover procedure. Additionally, the handover message 416 may include MIB information associated with the target cell. For example, the MIB information may include information associated with PBCH repetition.

Referring to FIG. 4B, based on the handover message 416, the UE 406 may determine 425 whether to perform a hypothesis test. When the handover message 416 includes information that indicates if PBCH repetition is enabled in the target base station 404b, the UE 406 may determine 425 that a hypothesis test is not needed. Instead, using the PBCH repetition information associated with the target cell, the UE 406 may decode 455 at least one of the control channel 408 and/or a data channel 408. In an aspect, the control channel 408 may include a MPDCCH and the data channel 408 may include a PDSCH.

When the UE 406 has information associated with the PBCH repetition, the UE 406 may avoid performing a hypothesis test, thus saving on processing and memory. In addition, delay and degradation in decoding of the MPDCCH 408 and/or PDSCH 408 at the time of handover may also be avoided if the handover message 416 includes PBCH repetition information. Further, if both the MIB information and the PBCH repetition information are provided in the handover message 416, the UE 406 may avoid decoding the MIB of the target cell altogether.

FIG. 5 is a diagram illustrating a transmission 500 that includes a PBCH repetition pattern in accordance with certain aspects of the disclosure. More specifically, the PBCH repetition pattern illustrated in FIG. 5 may be for a frequency division duplex (FDD) normal cyclic prefix (NCP). Although not illustrated, a similar PBCH repetition pattern applies to PBCH repetition in time division duplex (TDD). The transmission 500 may include one or more control regions and data regions. For example, the transmission 500 may be transmitted by a base station, such as target base station 404b illustrated in FIG. 4. For simplicity, only subframes 9 and 0 of the transmission 500 are illustrated in FIG. 5. However, the transmission 500 may include additional subframes without departing from the scope of the present disclosure.

Referring to FIG. 5, the transmission 500 may include symbols associated with legacy CRS antenna ports (APs) 502 (e.g., antenna ports 0 and 1) and 512 (e.g., antenna ports 2 and 3). In addition, the transmission 500 may include symbols associated with CRS copy APs 504 (e.g., antenna ports 0 and 1) and 514 (e.g., antenna ports 0 and 1). Further, the transmission 500 may include legacy DL control symbols 506. Still further, the transmission 500 may include PBCH symbol 1 508, PBCH symbol 2 518, PBCH symbol 3 510, and PBCH symbol 4 520. The transmission 500 may also include PSS/SSS 516. Additionally, the transmission 500 may include a legacy PBCH 522. The legacy PBCH 522 is denoted by R0 in slot 1 of subframe 0.

Still referring to FIG. 5, a first repetition (R1) of PBCH symbols is illustrated in the data region of slot 0 in subframe 9. A second repetition (R2) of PBCH symbols is illustrated in slot 1 in subframe 9. In addition, a third repetition (R3) of PBCH symbols is illustrated in slot 1 in subframe 9 and in the data region of slot 0 in subframe 0. Still further, a fourth repetition (R4) of PBCH symbols is illustrated in the data region of slot 0 and 1 in subframe 0.

With reference to FIGS. 4A and B, the UE 406 in the first example discussed above may perform a hypothesis test by applying a CRC to the legacy PBCH 522. If the legacy PBCH 522 does not pass the CRC, then the UE 406 may apply a CRC to each of PBCH repetitions R1, R2, R3, and R4. If R1, R2, R3, and R4 each pass the CRC, then the UE 406 may determine that PBCH repetition is enabled in the target cell.

Alternatively, if the legacy PBCH 522 passes the CRC but all of the PBCH repetitions do not pass the CRC, then the UE 406 may determine if PBCH repetition exists by combining a subset of PBCH repetitions R1, R2, R3, and/or R4 and applying a CRC. If the combined subset of PBCH repetitions passes the CRC, the UE 406 may determine that PBCH repetition is enabled in the target cell. However, if the combined subset of PBCH does not pass the CRC, then the UE 406 may determine that PBCH repetition is not enabled in the target cell.

As discussed above, a hypothesis test may use additional processing and use of memory at the UE 406. In addition, delay and degradation in decoding of the transmission 500 at the time of handover may be unavoidable because the handover message from the serving cell does not provide PBCH repetition information.

However, if the UE 406 is provided with PBCH repetition information (e.g., as in the second example discussed above with reference to FIGS. 4A and 4B), the decoding performance of the UE 406 may be improved because the UE 406 knows whether to ignore REs and/or symbols associated with PBCH repetitions (R1, R2, R3, R4) in the transmission 500 illustrated in FIG. 5.

Figure 6:
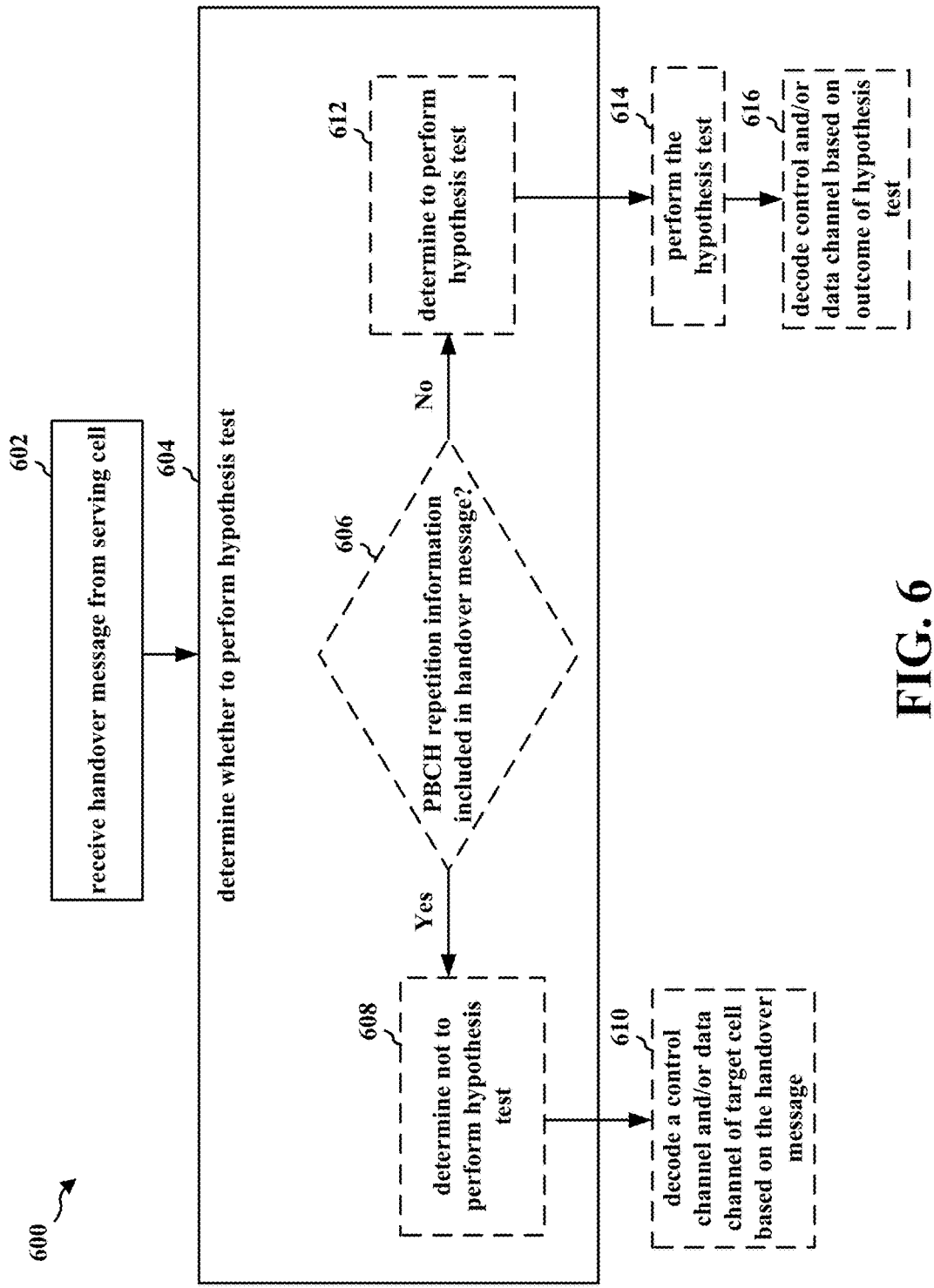
FIG. 6 is a flowchart of a method of wireless communication.

FIG. 6 is a flowchart 600 of a method of wireless communication. The method may be performed by a UE (e.g., the UE 104, 350, 406, 1055, apparatus 702/702') in communication with a serving base station (e.g., base station 102, 180, eNB 310, the serving base station 404a, 750 apparatus 1102/1102') and a target base station (e.g., base station 102, 180, eNB 310, the target base station 404b, 755, 1050). In FIG. 6, optional operations are indicated with dashed lines.

At 602, the UE may receive a handover message from a serving cell. In an aspect, the handover message may be associated with a handover procedure to a target cell. For example, referring to FIG. 4, a handover message 416 may be received by the UE 406 when a handover procedure is initiated.

At 604, the UE may determine whether to perform a hypothesis test to determine if a PBCH repetition is enabled in the target cell based on the handover message. For example, referring to FIG. 4, based on the handover message 416, the UE 406 may determine 425 whether to perform a hypothesis test to determine if PBCH repetition is enabled in the target cell.

At 606, the UE may determine if the handover message includes information that indicates if the PBCH repetition is enabled in the target cell. For example, referring to FIG. 4, the UE 406 may determine 425 if the handover message 416 includes information that indicates if PBCH repetition is enabled in the target cell.

At 608, if it is determined that the handover message includes PBCH repetition information associated with the target cell, the UE may determine not to perform the hypothesis test. For example, referring to FIG. 4, when the handover message 416 includes PBCH repetition information associated with the target cell, the UE 406 may determine 425 that a hypothesis test is not needed.

At 610, the UE may decode at least one of a control channel or a data channel of the target cell based on the information that indicates if PBCH repetition is enabled in the target cell. For example, referring to FIG. 4, using the PBCH repetition information, the UE 406 may decode 455 at least one of the control channel 408 and/or a data channel 408 of the target base station 404b.

At 612, if it is determined (at 606) that the handover message does not include PBCH repetition information associated with the target cell, the UE may determine to perform the hypothesis test. For example, referring to FIG. 4, if the handover message 416 does not include PBCH repetition information associated with the target cell, the UE 406 may determine 435 that a hypothesis test is needed to determine if PBCH repetition is enabled.

At 614, the UE may perform the hypothesis test to determine if the PBCH repetition is enabled in the target cell. For example, the UE 406 may perform 445 the hypothesis test using a first test that assumes PBCH repetition is present and using a second test that assumes that PBCH repetition is not present. In addition, referring to FIG. 5, the UE 406 may perform a hypothesis test by applying a CRC to the legacy PBCH 522. If the legacy PBCH 522 does not pass the CRC, then the UE 406 may apply a CRC to each of PBCH repetitions R1, R2, R3, and R4. If R1, R2, R3, and R4 each pass the CRC, then the UE 406 may determine that PBCH repetition is enabled in the target cell. Alternatively, if the legacy PBCH 522 passes the CRC but all of the PBCH repetitions do not pass the CRC, then the UE 406 may determine if PBCH repetition exists by combining a subset of PBCH repetitions R1, R2, R3, and/or R4 and applying a CRC. If the combined subset of PBCH repetitions passes the CRC, the UE 406 may determine that PBCH repetition is enabled in the target cell. However, if the combined subset of PBCH does not pass the CRC, then the UE 406 may determine that PBCH repetition is not enabled in the target cell.

At 616, the UE may decode at least one of a control channel or a data channel of the target cell based on an outcome of the hypothesis test. For example, referring to FIG. 4, based on the outcome of the hypothesis test, the UE 406 may decode 455 the control channel 408 and/or the data channel 408 of the target base station 404b.

Figure 7:
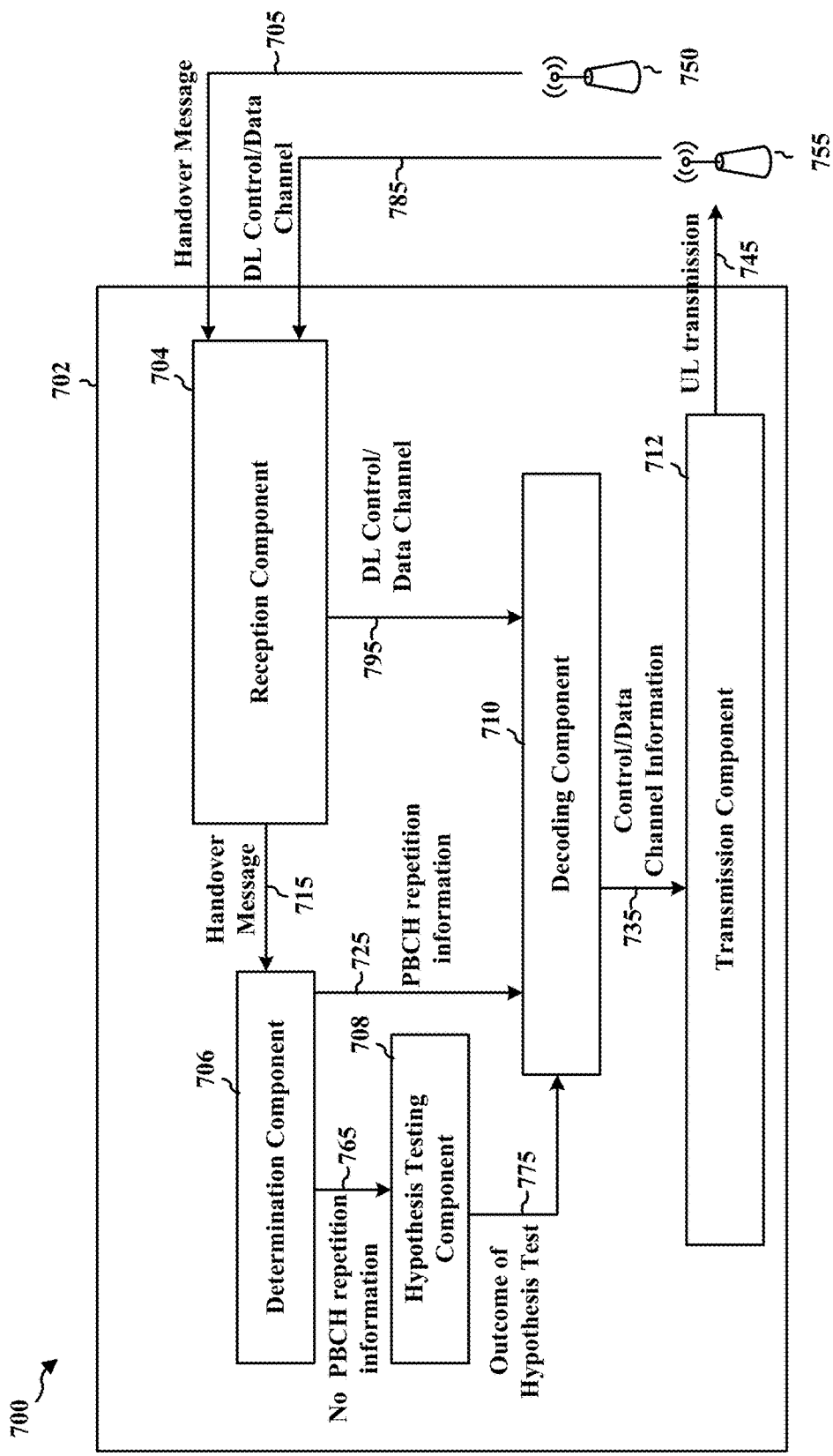
FIG. 7 is a conceptual data flow diagram illustrating the data flow between different means/components in an exemplary apparatus.

FIG. 7 is a conceptual data flow diagram 700 illustrating the data flow between different means/components in an exemplary apparatus 702. The apparatus may be a UE (e.g., the UE 104, 350, 406, 1055, apparatus 702') that is in communication with a serving base station 750 (e.g., base station 102, 180, eNB 310, the serving base station 404a, apparatus 1102/1102') and a target base station 755 (e.g., base station 102, 180, eNB 310, the target base station 404b, 1050).

In addition, the serving base station 750 may initiate a handover procedure to handover the apparatus 702 to a target base station 755. The apparatus may include a reception component 704 that may be configured to receive a handover message 705 from the serving base station 750 and a DL control channel and/or data channel 785 from the target base station 755. The reception component 704 may be configured to send a signal 715 associated with the handover message to determination component 706. In addition, the reception component 704 may be configured to send a signal 795 associated with the DL control channel and/or the data channel 785 to decoding component 710. Determination component 706 may be configured to determine whether to perform a hypothesis test to determine if PBCH repetition is enabled at the target base station 755 based on the handover message. In one aspect, the determination component 706 may be configured to determine if the handover message includes information that indicates if PBCH repetition is enabled at the target base station 755. When the handover message includes PBCH repetition information associated with the target base station 755, determination component 706 may be configured to determine not to perform the hypothesis test. In addition, when the determination component 706 determines that PBCH repetition information is included in the handover message 705, the determination component 706 may be configured to send a signal 725 associated with the PBCH repetition information to decoding component 710. Decoding component 710 may be configured to decode at least one of the DL control channel or a data channel 785 based on the PBCH repetition information. The decoding component 710 may be configured to send a signal 735 associated with the decoded DL control channel or data channel to the transmission component 712. Alternatively, when the handover message does not include PBCH repetition information associated with the target base station 755, determination component 706 may be configured to send a signal 765 to hypothesis testing component 708 that indicates that PBCH repetition information is not included in the handover message 705. Hypothesis testing component 708 may be configured to perform a hypothesis test to determine if PBCH repetition is enabled at the target base station 755. Hypothesis testing component 708 may be configured to send a signal 775 associated with the outcome of the hypothesis test to decoding component 710. Decoding component 710 may be configured to decode at least one of the DL control channel or a data channel 785 of the target base station 755 based on the outcome of the hypothesis test. Decoding component 710 may be configured to send a signal 735 associated with the decoded DL control channel and/or data channel to transmission component 712. Transmission component 712 may be configured to send UL transmissions 745 to the target base station 755 once the target cell has been acquired.

The apparatus may include additional components that perform each of the blocks of the algorithm in the aforementioned flowchart of FIG. 6. As such, each block in the aforementioned flowchart of FIG. 6 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 8:
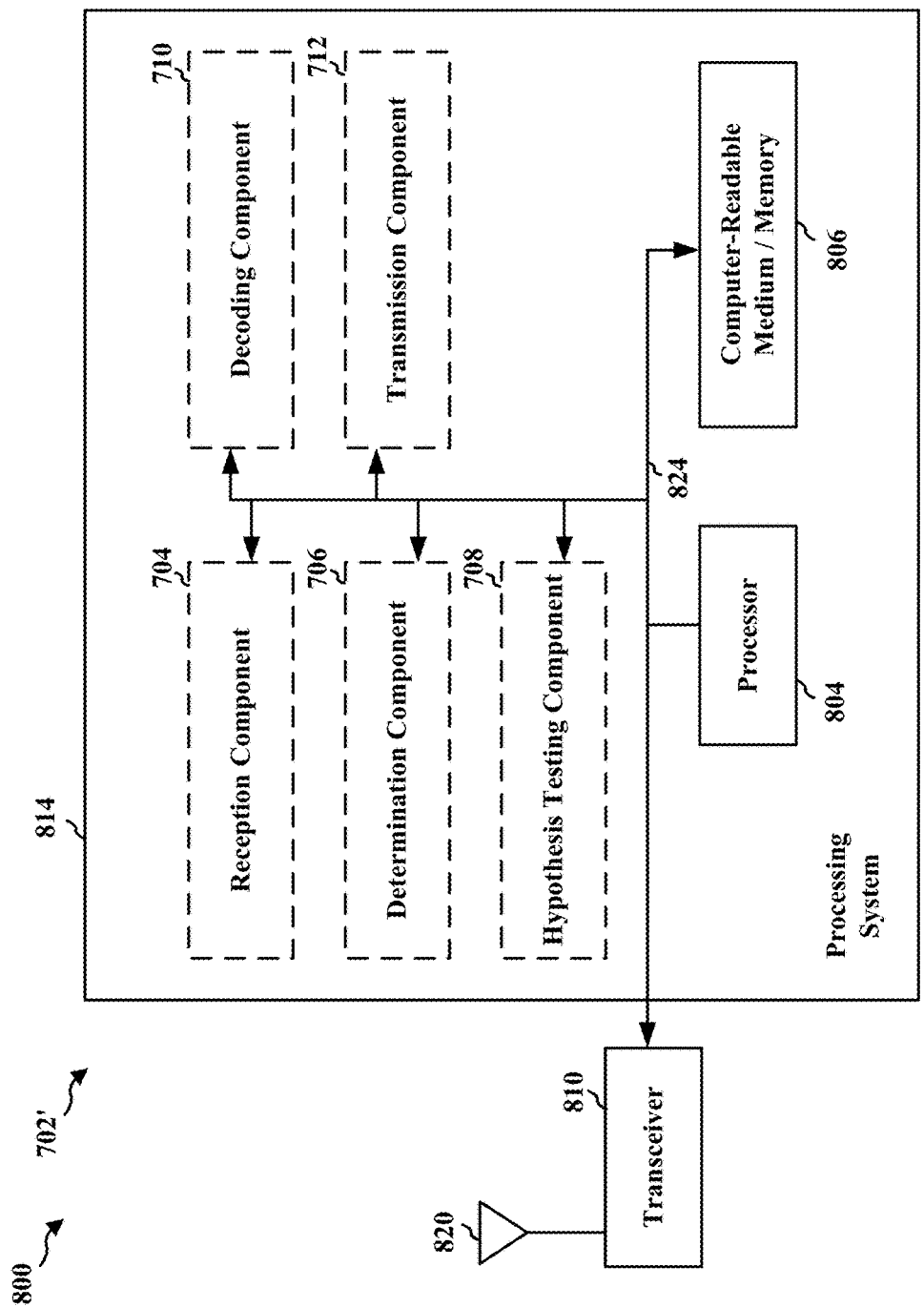
FIG. 8 is a diagram illustrating an example of a hardware implementation for an apparatus employing a processing system.

FIG. 8 is a diagram 800 illustrating an example of a hardware implementation for an apparatus 702' employing a processing system 814. The processing system 814 may be implemented with a bus architecture, represented generally by the bus 824. The bus 824 may include any number of interconnecting buses and bridges depending on the specific application of the processing system 814 and the overall design constraints. The bus 824 links together various circuits including one or more processors and/or hardware components, represented by the processor 804, the components 704, 706, 708, 710, 712 and the computer-readable medium/memory 806. The bus 824 may also link various other circuits such as timing sources, peripherals, voltage regulators, and power management circuits, which are well known in the art, and therefore, will not be described any further.

The processing system 814 may be coupled to a transceiver 810. The transceiver 810 is coupled to one or more antennas 820. The transceiver 810 provides a means for communicating with various other apparatus over a transmission medium. The transceiver 810 receives a signal from the one or more antennas 820, extracts information from the received signal, and provides the extracted information to the processing system 814, specifically the reception component 704. In addition, the transceiver 810 receives information from the processing system 814, specifically the transmission component 712, and based on the received information, generates a signal to be applied to the one or more antennas 820. The processing system 814 includes a processor 804 coupled to a computer-readable medium/memory 806. The processor 804 is responsible for general processing, including the execution of software stored on the computer-readable medium/memory 806. The software, when executed by the processor 804, causes the processing system 814 to perform the various functions described supra for any particular apparatus. The computer-readable medium/memory 806 may also be used for storing data that is manipulated by the processor 804 when executing software. The processing system 814 further includes at least one of the components 704, 706, 708, 710, 712. The components may be software components running in the processor 804, resident/stored in the computer readable medium/memory 806, one or more hardware components coupled to the processor 804, or some combination thereof. The processing system 814 may be a component of the UE 350 and may include the memory 360 and/or at least one of the TX processor 368, the RX processor 356, and the controller/processor 359.

In one configuration, the apparatus 702/702' for wireless communication may include means for receiving a handover message from a serving cell. In an aspect, the handover message may be associated with a handover procedure to a target cell. In another configuration, the apparatus 702/702' for wireless communication may include means for determining whether to perform a hypothesis test to determine if a PBCH repetition is enabled in the target cell based on the handover message. In an aspect, the means for determining whether to perform the hypothesis test may be configured to determine if the handover message includes information that indicates if the PBCH repetition is enabled in the target cell. In a further aspect, the means for determining whether to perform the hypothesis test may be configured to determine not to perform the hypothesis test when the handover message includes information that indicates if the PBCH repetition is enabled in the target cell. In a further configuration, the apparatus 702/702' for wireless communication may include means for decoding at least one of a control channel or a data channel of the target cell based on the information that indicates if the PBCH repetition is enabled in the target cell. In an additional aspect, the means for determining whether to perform the hypothesis test may be configured to determine to perform the hypothesis test when the handover message does not include information that indicates if the PBCH repetition is enabled in the target cell. In another configuration, the apparatus 702/702' for wireless communication may include means for performing the hypothesis test to determine if the PBCH repetition is enabled in the target cell. In a further configuration, the apparatus 702/702' for wireless communication may include means for decoding at least one of a control channel or a data channel of the target cell based on an outcome of the hypothesis test. The aforementioned means may be one or more of the aforementioned components of the apparatus 702 and/or the processing system 814 of the apparatus 702' configured to perform the functions recited by the aforementioned means. As described above, the processing system 814 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

Figure 9:
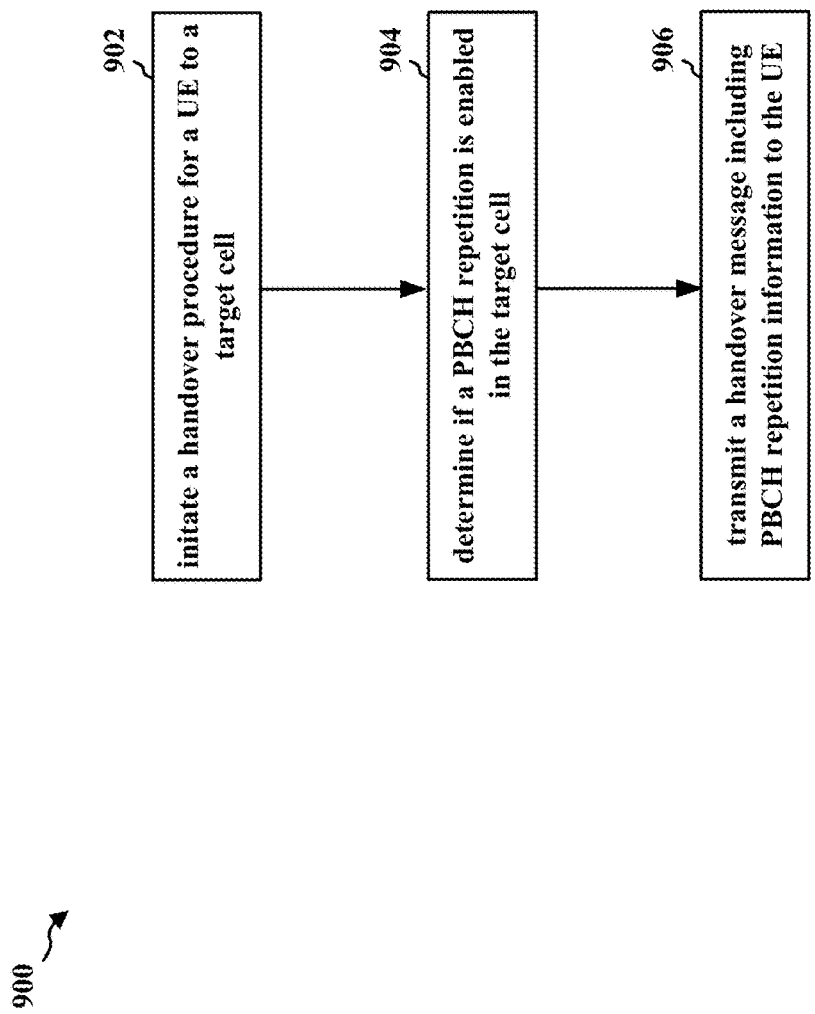
FIG. 9 is a flowchart of a method of wireless communication.

FIG. 9 is a flowchart 900 of a method of wireless communication. The method may be performed by a serving base station (e.g., base station 102, 180, eNB 310, the serving base station 404a, 750, apparatus 1102/1102') in communication with a target base station (e.g., base station 102, 180, eNB 310, the target base station 404b, 755, 1050) and a UE (e.g., the UE 104, 350, 406, 1055, apparatus 702/702').

At 902, the base station may initiate a handover procedure for a UE to a target cell. For example, referring to FIG. 4, the serving base station 404a may initiate 405 a procedure to handover the UE 406 to the target base station 404b.

At 904, the base station may determine if a PBCH repetition is enabled in the target cell. For example, referring to FIG. 4, during a handover procedure 405, the serving base station 404a may be configured to determine 415 if a PBCH repetition is enabled in the target cell.

At 906, the base station may transmit a handover message to the UE. In an aspect, the handover message may include information that indicates if the PBCH repetition is enabled in the target cell. The information may indicate that the PBCH repetition is enabled in the target cell or the information may indicate that the PBCH repetition is not enabled in the target cell. For example, referring to FIG. 4, the information included in the handover message 416 may indicate that PBCH repetition is enabled at the target base station 404b. Alternatively, the information included in the handover message 416 may indicate that PBCH reception is not enabled in the target base station 404b. In one embodiment, the serving base station 404a may add one or more bit(s) to the handover message 416 that is/are used to indicate to the UE 406 whether or not PBCH repetition is enabled at the target base station 404b.

Figure 10:
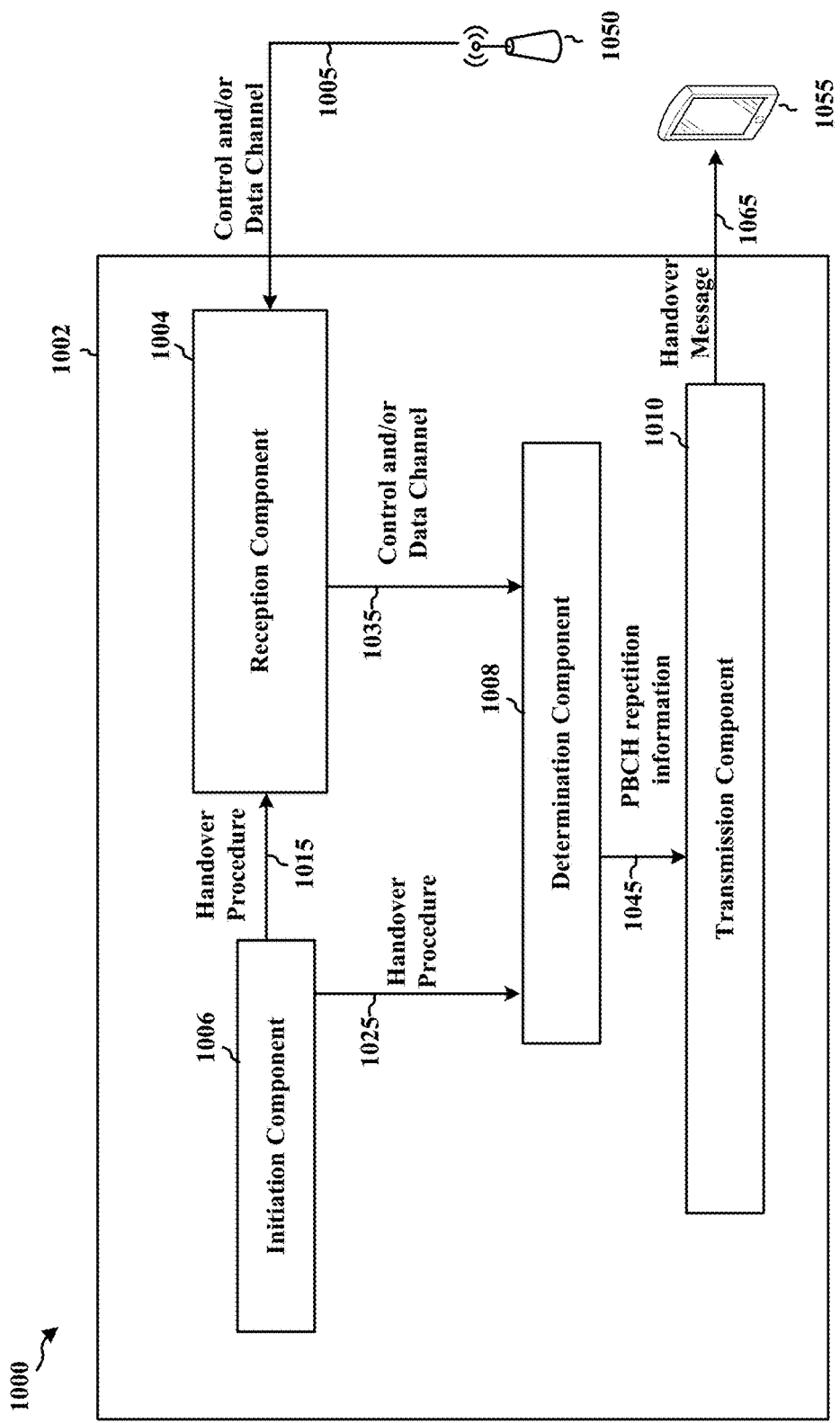
FIG. 10 is a conceptual data flow diagram illustrating the data flow between different means/components in an exemplary apparatus.

FIG. 10 is a conceptual data flow diagram 1000 illustrating the data flow between different means/components in an exemplary apparatus 1002. The apparatus may be a serving base station (e.g., base station 102, 180, eNB 310, the serving base station 404a, 750, apparatus 1102') that is in communication with a target base station 1050 (e.g., base station 102, 180, eNB 310, the target base station 404b, 755) and a UE 1055 (e.g., the UE 104, 350, 406, apparatus 702/702').

The apparatus may include an initiation component 1006 that is configured to initiate a handover procedure for the UE 1055 to the target base station 1050. Initiation component 1006 may be configured to send a signal 1015, 1025 associated with the handover procedure to one or more of reception component 1004 and/or determination component 1008. Reception component 1004 may be configured to receive a control channel and/or a data channel 1005 from the target base station 1050. Reception component 1004 may be configured to send a signal 1035 associated with the control channel and/or the data channel to determination component 1008. Determination component 1008 may be configured to determine if PBCH repetition is enabled at the target base station 1050 based on signal 1035. The determination component 1008 may be configured to send a signal 1045 associated with PBCH repetition information associated with the target base station 1050 to transmission component 1010. Transmission component 1010 may be configured to transmit a handover message 1065 to the UE 1055 that includes PBCH repetition information associated with target base station 1050.

The apparatus may include additional components that perform each of the blocks of the algorithm in the aforementioned flowchart of FIG. 9. As such, each block in the aforementioned flowchart of FIG. 9 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 11:
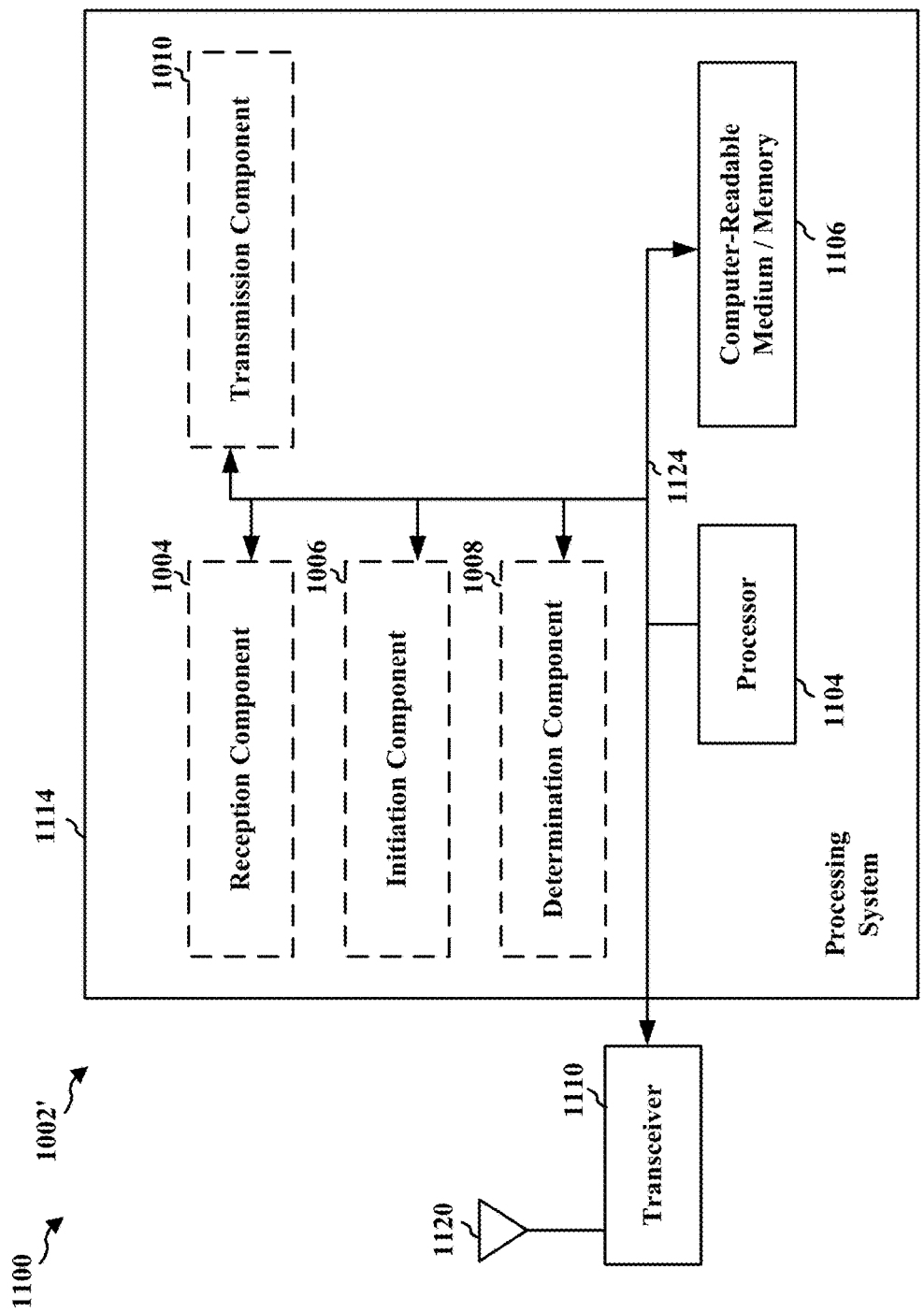
FIG. 11 is a diagram illustrating an example of a hardware implementation for an apparatus employing a processing system.

FIG. 11 is a diagram 1100 illustrating an example of a hardware implementation for an apparatus 1002' employing a processing system 1114. The processing system 1114 may be implemented with a bus architecture, represented generally by the bus 1124. The bus 1124 may include any number of interconnecting buses and bridges depending on the specific application of the processing system 1114 and the overall design constraints. The bus 1124 links together various circuits including one or more processors and/or hardware components, represented by the processor 1104, the components 1004, 1006, 1008, 1010 and the computer-readable medium/memory 1106. The bus 1124 may also link various other circuits such as timing sources, peripherals, voltage regulators, and power management circuits, which are well known in the art, and therefore, will not be described any further.

The processing system 1114 may be coupled to a transceiver 1110. The transceiver 1110 is coupled to one or more antennas 1120. The transceiver 1110 provides a means for communicating with various other apparatus over a transmission medium. The transceiver 1110 receives a signal from the one or more antennas 1120, extracts information from the received signal, and provides the extracted information to the processing system 1114, specifically the reception component 1004. In addition, the transceiver 1110 receives information from the processing system 1114, specifically the transmission component 1010, and based on the received information, generates a signal to be applied to the one or more antennas 1120. The processing system 1114 includes a processor 1104 coupled to a computer-readable medium/memory 1106. The processor 1104 is responsible for general processing, including the execution of software stored on the computer-readable medium/memory 1106. The software, when executed by the processor 1104, causes the processing system 1114 to perform the various functions described above for any particular apparatus. The computer-readable medium/memory 1106 may also be used for storing data that is manipulated by the processor 1104 when executing software. The processing system 1114 further includes at least one of the components 1004, 1006, 1008, 1010. The components may be software components running in the processor 1104, resident/stored in the computer readable medium/memory 1106, one or more hardware components coupled to the processor 1104, or some combination thereof. The processing system 1114 may be a component of the eNB 310 and may include the memory 376 and/or at least one of the TX processor 316, the RX processor 370, and the controller/processor 375

In one configuration, the apparatus 1002/1002' for wireless communication may include means for initiating a handover procedure for a UE to a target cell. In another configuration, the apparatus 1002/1002' for wireless communication may include means for determining if a PBCH repetition is enabled in the target cell. In a further configuration, the apparatus 1002/1002' for wireless communication may include means for transmitting a handover message to the UE. In an aspect, the handover message may include information that indicates if the PBCH repetition is enabled in the target cell. In an aspect, the information may indicate that the PBCH repetition is enabled in the target cell. In another aspect, the information may indicate that the PBCH repetition is not enabled in the target cell. The aforementioned means may be one or more of the aforementioned components of the apparatus 1002 and/or the processing system 1114 of the apparatus 1002' configured to perform the functions recited by the aforementioned means. As described supra, the processing system 1114 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

It is understood that the specific order or hierarchy of blocks in the processes/flowcharts disclosed is an illustration of exemplary approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication, comprising:
   receiving a handover message from a serving cell, the handover message associated with a handover procedure to a target cell; and
   determining whether to perform a hypothesis test to determine if a physical broadcast channel (PBCH) repetition is enabled in the target cell based on the handover message, wherein the determining whether to perform the hypothesis test comprises:
      determining whether the handover message includes information that indicates if the PBCH repetition is enabled in the target cell.

2. The method of claim 1, wherein the determining whether to perform the hypothesis test further comprises:
   determining not to perform the hypothesis test when the handover message includes information that indicates if the PBCH repetition is enabled in the target cell.

3. The method of claim 2, further comprising:
   decoding at least one of a control channel or a data channel of the target cell based on the information that indicates if the PBCH repetition is enabled in the target cell.

4. The method of claim 1, wherein the determining whether to perform the hypothesis test further comprises:
   determining to perform the hypothesis test when the handover message does not include information that indicates if the PBCH repetition is enabled in the target cell.

5. The method of claim 4, further comprising:
   performing the hypothesis test to determine if the PBCH repetition is enabled in the target cell.

6. The method of claim 5, further comprising:
   decoding at least one of a control channel or a data channel of the target cell based on an outcome of the hypothesis test.

7. A method of wireless communication, comprising:
   initiating a handover procedure for a user equipment (UE) to a target cell;
   determining if a physical broadcast channel (PBCH) repetition is enabled in the target cell; and transmitting a handover message to the UE, the handover message including information that indicates if the PBCH repetition is enabled in the target cell.

8. The method of claim 7, wherein the information indicates that the PBCH repetition is enabled in the target cell.

9. The method of claim 7, wherein the information indicates that the PBCH repetition is not enabled in the target cell.

10. An apparatus for wireless communication, comprising:
a memory; and
at least one processor coupled to the memory and configured to:
receive a handover message from a serving cell, the handover message associated with a handover procedure to a target cell; and
determine whether to perform a hypothesis test to determine if a physical broadcast channel (PBCH) repetition is enabled in the target cell based on the handover message, wherein the at least one processor is configured to determine whether to perform the hypothesis test by:
determining if the handover message includes information that indicates if the PBCH repetition is enabled in the target cell.

11. The apparatus of claim 10, wherein the at least one processor is further configured to determine whether to perform the hypothesis test by:
determining not to perform the hypothesis test when the handover message includes information that indicates if the PBCH repetition is enabled in the target cell.

12. The apparatus of claim 11, wherein the at least one processor is further configured to:
decode at least one of a control channel or a data channel of the target cell based on the information that indicates if the PBCH repetition is enabled in the target cell.

13. The apparatus of claim 10, wherein the at least one processor is further configured to determine whether to perform the hypothesis test by:
determining to perform the hypothesis test when the handover message does not include information that indicates if the PBCH repetition is enabled in the target cell.

14. The apparatus of claim 13, wherein the at least one processor is further configured to:
perform the hypothesis test to determine if the PBCH repetition is enabled in the target cell.

15. The apparatus of claim 14, wherein the at least one processor is further configured to:
decode at least one of a control channel or a data channel of the target cell based on an outcome of the hypothesis test.

16. An apparatus for wireless communication, comprising:
a memory; and
at least one processor coupled to the memory and configured to:
initiate a handover procedure for a user equipment (UE) to a target cell;
determine if a physical broadcast channel (PBCH) repetition is enabled in the target cell; and
transmit a handover message to the UE, the handover message including information that indicates if the PBCH repetition is enabled in the target cell.

17. The apparatus of claim 16, wherein the information indicates that the PBCH repetition is enabled in the target cell.

18. The apparatus of claim 16, wherein the information indicates that the PBCH repetition is not enabled in the target cell.

* * * * *